July 30, 1968 D. M. TAYLOR ET AL 3,394,516
SPACER
Filed July 6, 1965
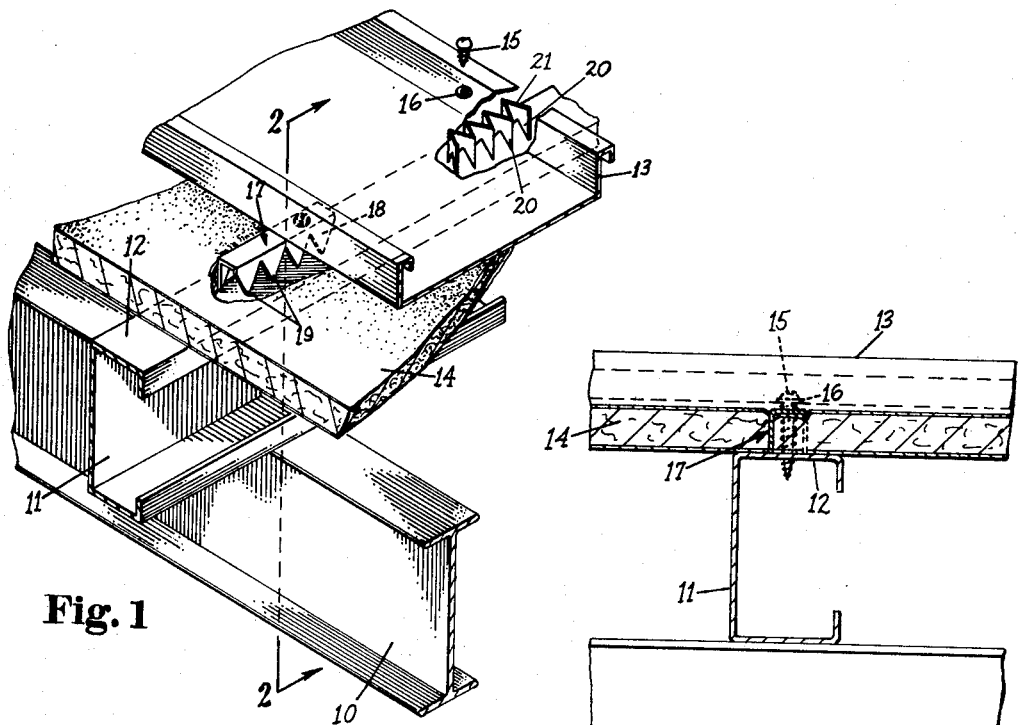
Fig. 1
Fig. 2
Fig. 3
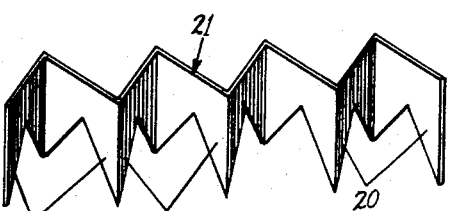
Fig. 4
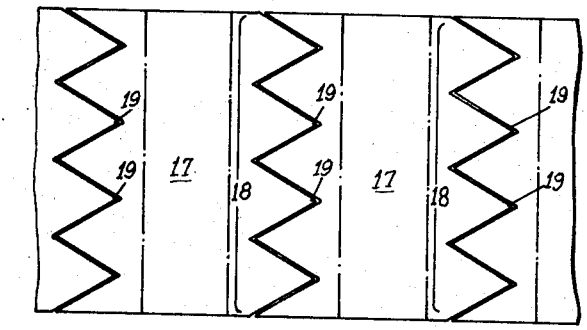
Fig. 5
INVENTORS
DONALD M. TAYLOR AND
PAUL S. BUKER,
BY Yungblut, Melville,
Strasser & Foster
ATTORNEYS

United States Patent Office 3,394,516
Patented July 30, 1968

3,394,516
SPACER
Donald M. Taylor, Trenton, and Paul S. Buker, Le Sourdsville, Ohio, assignors to Armco Steel Corporation, Middletown, Ohio, a corporation of Ohio
Filed July 6, 1965, Ser. No. 469,697
5 Claims. (Cl. 52—410)

ABSTRACT OF THE DISCLOSURE

Devices for spacing and supporting exterior panels relative to the supporting members in wall structures and the like, particularly wall structures incorporating insulation between the supporting members and exterior panels.

---

A common method of constructing roofs and walls utilizes a supporting framework to which insulating material of either the semi-rigid board type or the compressible blanket type is applied and over which panels are secured. These panels are fastened to the supporting structure by means of screws, bolts or other suitable fasteners which must necessarily pass through the insulating material. The fastening means may have rubber or plastic gaskets disposed beneath their heads to provide a weather and water tight seal for exterior surfaces of panels when the fastening means are tightened against them. There are several major deficiencies of such construction.

If compressible insulating material is used, the tightening of the fastening means forces the exterior panels tightly in against the insulating material, thereby crushing and compressing the insulating material where it comes into contact with the supporting structure. Further, particularly in roof structures, the weight of workmen walking on the panels will compress and crush the compressible insulating material against the supporting structure. This crushing and compressing action forces air from between the fibers of the insulating material in the area of compression and since the insulating efficiency of compressible insulating materials depends in part at least on the entrapment of air between the fibers thereof, the material loses insulating efficiency in the areas of compression. If the exterior panels are not pulled tightly enough against the insulating material, they will not be firmly held in place in relation to the supporting structure or the gaskets beneath the heads of the fastening means. This prevents the provision of a weather and water proof seal where the fastening means pierce the panels, permits buckling of the panels, poor fitting of the panels in relation to each other and rattling of the panels under windy conditions.

Even the use of semi-rigid board-type insulating material of sufficient strength to permit the exterior panels to be relatively firmly fastened down without significant compression of the insulation does not entirely solve the problem. The weight of workmen walking on roofs of such construction will cause sufficient dimpling in the exterior panels to break the weather and waterproof seals formed by the gaskets beneath the heads of the fastening means, and indentations in walls as well as roofs can result from a variety of causes.

Accordingly, it is a principal object of this invention to provide means to prevent the panels in such structures from being pulled so close to the supporting structure as to crush or compress the intervening layer of compressible insulating material.

Another object of this invention is to provide means to accomplish the above object while permitting the panels to be fastened to the supporting structure in firm and immovable relation thereto.

A further object is to provide means for accomplishing the above objectives while maintaining the panels in firm and immovable relation to sealing gaskets affixed to the fastening means, thus maintaining a weather and waterproof seal where the fastening means pierce the panels.

Still another object of the invention is the provision of a spacing and supporting means which can be employed after the insulating material has been positioned; that is, in constructing a roof, it is important that the spacer of this invention can be applied from the top while placing the panels in position.

A still further object of this invention is to provide simple and inexpensive means for accomplishing these objectives which may be manufactured with a minimum of wasted or scrap material.

These and other objects which will become apparent to a worker skilled in this art upon reading the following specification in conjunction with the annexed drawings, are accomplished by the exemplary embodiments of this invention which shall now be described.

In the drawings:

FIGURE 1 is a perspective view illustrating a roof structure incorporating two devices according to this invention.

FIGURE 2 is a cross-section of said roof construction taken at line 2—2 of FIGURE 1.

FIGURE 3 is a perspective view of one embodiment of a device according to this invention.

FIGURE 4 is a perspective view of another embodiment of a device according to this invention.

FIGURE 5 is a plan view of a flat piece of rigid sheet material which has been die-cut into shape for further forming into the embodiments shown in FIGURE 3.

It will be understood that, although FIGURES 1 and 2 show embodiments as incorporated in a roof structure, no limitation is intended thereby.

Reference is now made to the drawings in order to describe the invention in more detail.

The invention is illustrated in FIGURES 1 and 2 as embodied in a metal roof having the conventional supports 10 which are shown as being in the form of I-beams. On the upper flanges of these supports 10 are secured purlins 11 which are uniformly spaced in rows transverse to the supports 10. Each purlin is shown as being generally C-shaped in cross-section, having an upper flange 12.

Before the exterior roofing panels 13 are applied, insulation 14 is laid upon the upper flanges 12 of the purlins 11.

In a conventional roofing structure the next step, after sufficient insulation has been laid to cover the area to be protected by exterior roofing panels, would be to lay a section of roofing panel 13, shown in a well known form of metal exterior roof sheeting. The roofing panel 13 would then be fastened directly to the upper flange 12 of the purlin beneath it by means of a sheet metal screw 15 or other suitable conventional fastening device, having beneath its head a gasket 16 which when compressed against the roofing panel 13 is intended to form a weather and water tight seal.

If blankets of compressible insulation are used, the process of laying the roofing panel would in itself tend to crush and compress the insulation material against the upper flanges of the purlins and the tightening of the fastening devices used to secure the exterior roofing panel to the upper flanges of the purlins would further crush and compress the insulation thereagainst. To avoid such crushing and compression while at the same time permitting the exterior roofing panel to be fastened to the upper flanges of the purlins in firm and immovable relation thereto and in firm and immovable relation to the gaskets 16, the spacer of this invention is provided.

The exemplary embodiments of the device shown in the drawings may be constructed of sheet metal or any other suitable rigid material.

The embodiment illustrated in FIGURE 3 comprises a base or uppper surface 17 and at least a pair of legs 18 projecting downwardly respectively from opposite sides of the upper surface at approximately a 90° angle thereto. The legs 18 will be of a length substantially equal to the thickness of the insulating material used. Preferably, the legs 18 include a plurality of points 19; that is, the free edge of each leg 18 is deeply serrated. Other designs are of course possible, but it is to be preferred that the legs are narrower at their free ends than at the ends engaging with the upper surface so that the legs will more readily pierce the insulating material and come into contact with the upper flanges 12 of the purlins with a minimum of effort and compression of the insulating material, and for the further purpose of reducing the thermal conductivity of the system.

The device illustrated in FIGURE 4 comprises a strip of sheet material one of the longitudinal edges of which is deeply serrated, and having accordion style folds along transverse lines meeting the free tips of the serrations. The serrations thus form projecting leg members 20 which pierce the insulation 14 and come into contact with the upper flanges 12 of the purlins, while the opposite longitudinal edge forms a planar zigzag upper surface 21 on which the roofing panels 13 rest.

As best illustrated in FIGURE 2, after the insulation 14 is laid over the upper flanges 12 of the purlins, spacers of this invention are placed along the upper flanges 12 of the purlins by pressing them legs first through the insulation 14 so that the free ends of the legs come into contact with said upper flanges of the purlins. The roofing panels 13 are then laid over the insulation and fastened to the upper flanges 12 of the purlins by sheet metal screws 15 or other suitable conventional fastening devices. Preferably the fastening devices would be placed through or in close proximity to the spacers so that indentations in or dimpling of the roofing panels in the area of the spacers may be avoided, thus maintaining the seals formed by the gaskets 16. In the embodiment illustrated in FIGURE 3, the fastening devices will pass through openings drilled during installation through the upper surface thereof, and in the embodiment of FIGURE 4, the fastening devices should pass between the folds. When the fastening devices are tightened, the interior surface of the roofing panel will come into contact with the upper surface 17 or 21 respectively of the spacer, and the legs 18 or 20 respectively will maintain the roofing panel in firm and immovable relation to both the upper flange 12 of the purlins and the gasket 16 at a distance approximately equal to the thickness of the insulation. Crushing and compressing of the insulation is thus prevented, and a firm and immovable surface is provided against which the gaskets may be compressed to form a permanent seal.

As illustrated by FIGURE 5, the serrated edge of one of the projecting legs members 17 of the embodiment of the invention shown in FIGURE 3 complements the serrated edge of its opposing projecting leg member. This construction readily lends itself to the manufacture of a plurality of such devices from a single strip of stock material by a continuously fed die-cutting machine with virtually no scrap by-product. It will be obvious that that the embodiment shown in FIGURE 4 also possesses this advantage.

It is believed that the foregoing constitutes a full and complete disclosure of the principles of this invention. It will, of course, be understood that many modifications can be made by the skilled worker in the art without departing from its scope and spirit. Further, while the invention has been shown and described as embodied in a particular structure and arrangement, the invention is not to be limited to such structure and arrangement except insofar as they are specifically set forth in the subjoined claims.

The embodiments of the invention in which an exclusive property or privilege is claimed are defined as follows:

1. In a wall structure or the like including a plurality of substantially parallel supporting members, insulation continuously overlying said members, exterior panels overlying said insulation, and means fastening said panels to said supporting members extending through said panels and said insulation and engaging said supporting members urging said panels toward said supporting members, a channel-shaped spacer positioned between and in contact with said supporting members and said panels, said spacer having a planar top contacting and supporting said panels and a pair of leg members projecting downwardly from opposite edges of said top and piercing and extending through said insulation and contacting said supporting members at spaced intervals along the length of the leg members, the height of said leg members being substantially equal to the thickness of said insulation.

2. The spacer claimed in claim 1 wherein said leg members have deeply serrated edges contacting said supporting members, whereby to reduce thermal conductivity between the supporting members and the panels and to readily pierce said insulation without undue compression thereof.

3. The spacer claimed in claim 2 wherein the serrations of one leg member are staggered with respect to the serrations of the opposite leg member.

4. In a wall structure or the like including a plurality of substantially parallel supporting members, insulation overlying said supporting members, exterior panels overlying said insulation, and means for fastening said panels to said supporting members extending through said panels and said insulation and engaging said supporting members and tending to pull said panels toward said supporting members, the improvement which comprises: a spacer positioned between and in contact with said supporting members and said panels, said spacer comprising a strip of sheet material having a deeply serrated edge, accordion style folds along lines transverse to the length of the strip, said lines meeting the free tips of the serrations, and an opposite edge which forms a planar zig zag surface, said serrations projecting through said insulation and contacting the supporting members with their free ends, whereby to reduce thermal conductivity between the supporting members and the panels and to readily pierce said insulation without undue compression thereof, and said planar zig zag surface contacting and supporting said panels at a distance from said supporting members substantially equal to the thickness of said insulation.

5. In a wall structure or the like including a plurality of substantially parallel supporting members, insulation overlying said supporting members, panels overlying said insulation, and means extending through said panels and said insulation and engaging said supporting members and tending to pull said panels toward said supporting members, the improvement which comprises: a spacer positioned between and contacting said supporting members and said panels having at least three non-linearly arranged pointed legs which pass through said insulation, the pointed ends of which rest on said supporting members and a planar surface at the opposite ends of said legs which surface contacts and supports said panels at a distance from said supporting members substantially equal to the thickness of said insulation.

References Cited
UNITED STATES PATENTS

| 1,043,199 | 11/1912 | Burk | 52—687 |
| 1,376,751 | 5/1921 | Edwards | 52—553 X |
| 2,256,961 | 9/1941 | Pearson | 52—410 X |
| 2,696,281 | 12/1954 | Hedgren | 52—553 |
| 3,031,044 | 4/1962 | Stitt | 52—410 |
| 3,209,503 | 10/1965 | Mostoller | 52—478 X |
| 1,562,784 | 11/1925 | Olsen | 52—715 X |
| 2,582,144 | 1/1952 | Miles | 52—404 |

HENRY C. SUTHERLAND, *Primary Examiner.*

M. O. WARNECKE, *Assistant Examiner.*